US012288507B2

(12) United States Patent
Kim et al.

(10) Patent No.: US 12,288,507 B2
(45) Date of Patent: *Apr. 29, 2025

(54) LIGHT-EMITTING DISPLAY DEVICE

(71) Applicant: LG Display Co., Ltd., Seoul (KR)

(72) Inventors: Jeong Ki Kim, Gimpo-si (KR); Joon Young Park, Goyang-si (KR); Jae Woo Park, Goyang-si (KR); Sung Min Cho, Goyang-si (KR); Hyeong Kyu Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/395,287

(22) Filed: Dec. 22, 2023

(65) Prior Publication Data

US 2024/0127746 A1 Apr. 18, 2024

Related U.S. Application Data

(63) Continuation of application No. 17/783,881, filed as application No. PCT/KR2020/004371 on Mar. 30, 2020, now Pat. No. 11,887,530.

(30) Foreign Application Priority Data

Dec. 31, 2019 (KR) ........................ 10-2019-0179758

(51) Int. Cl.
*G09G 3/32* (2016.01)

(52) U.S. Cl.
CPC ....... *G09G 3/32* (2013.01); *G09G 2310/0216* (2013.01); *G09G 2310/0251* (2013.01);
(Continued)

(58) Field of Classification Search
CPC ... G09G 3/32–3291; G09G 2300/0426; G09G 2310/0216; G09G 2310/0221;
(Continued)

(56) References Cited

U.S. PATENT DOCUMENTS 10,878,756 B1 12/2020 Lu et al.
2004/0085332 A1 5/2004 Nakaoka et al.
(Continued)

FOREIGN PATENT DOCUMENTS

CN 103531149 A 1/2014
CN 108287407 A 7/2018
(Continued)

OTHER PUBLICATIONS

Extended European Search Report from the EPO issued on Nov. 27, 2023, in connection with related EP Application No. 20910652.5.
(Continued)

*Primary Examiner* — Nathan Danielsen
(74) *Attorney, Agent, or Firm* — Morgan, Lewis & Bockius LLP

(57) ABSTRACT

A light emitting display device includes a display panel including a first pixel group including a plurality of pixels in 2N rows. The light emitting display device further includes a second pixel group disposed subsequent to the first pixel group and including a plurality of pixels in 2N rows. The light emitting display device further includes an emission signal unit including a first emission stage for applying the same first emission signal to the first pixel group and a second emission stage for applying the same second emission signal to the second pixel group. In a first frame, a falling time of the first emission signal and a rising time of the second emission signal are different from each other.

17 Claims, 13 Drawing Sheets

(52) U.S. Cl.
CPC ............... *G09G 2310/0267* (2013.01); *G09G 2310/067* (2013.01); *G09G 2310/08* (2013.01); *G09G 2320/0219* (2013.01); *G09G 2320/0233* (2013.01)

(58) Field of Classification Search
CPC ... G09G 2310/0243; G09G 2310/0251; G09G 2310/0267; G09G 2310/0281; G09G 2310/06; G09G 2310/067; G09G 2310/08; G09G 2320/0209; G09G 2320/0219; G09G 2320/0233; G09G 2320/0247; G09G 2320/0257; G09G 2320/0266
See application file for complete search history.

(56) References Cited

U.S. PATENT DOCUMENTS

| | | | | |
|---|---|---|---|---|
| 2005/0195178 | A1 | 9/2005 | Jo et al. | |
| 2006/0279478 | A1 | 12/2006 | Ikegami | |
| 2008/0211745 | A1 | 9/2008 | Lee et al. | |
| 2011/0157126 | A1 | 6/2011 | Chung et al. | |
| 2012/0026207 | A1 | 2/2012 | Komiya et al. | |
| 2012/0169574 | A1 | 7/2012 | Kim | |
| 2015/0002560 | A1 | 1/2015 | Kwon et al. | |
| 2015/0348504 | A1* | 12/2015 | Sakariya | G09G 3/2092 345/82 |
| 2016/0019836 | A1 | 1/2016 | Qing et al. | |
| 2017/0092219 | A1 | 3/2017 | Ooishi et al. | |
| 2017/0243557 | A1 | 8/2017 | Yoon | |
| 2018/0130421 | A1 | 5/2018 | Zhou et al. | |
| 2018/0197480 | A1 | 7/2018 | Choi et al. | |
| 2020/0294445 | A1 | 9/2020 | Pyo et al. | |
| 2020/0320922 | A1 | 10/2020 | Ko | |

FOREIGN PATENT DOCUMENTS

| | | | |
|---|---|---|---|
| KR | 10-0691694 | B1 | 3/2007 |
| KR | 10-2012-0010826 | A | 2/2012 |
| KR | 10-2015-0002135 | A | 1/2015 |
| KR | 10-2018-0082692 | A | 7/2018 |
| KR | 10-2019-0012053 | A | 2/2019 |

OTHER PUBLICATIONS

International Search Report (with partial translation) and Written Opinion dated Sep. 17, 2020, for corresponding International Patent Application No. PCT/KR2020/004371.

Office Action issued on Feb. 27, 2025 in connection with the counterpart CN Application No. 202080085043.8.

* cited by examiner

LIGHT-EMITTING DISPLAY DEVICE

CROSS-REFERENCE TO RELATED APPLICATIONS

This application is a continuation of U.S. application Ser. No. 17/783,881, which is a U.S. National Stage of PCT International Application No. PCT/KR2020/004371, filed on Mar. 30, 2020, which claims priority from Korean Patent Application No. 10-2019-0179758, filed on Dec. 31, 2019. Each of the above prior U.S., PCT, and Korean applications is incorporated herein by reference in its entirety.

TECHNICAL FIELD

The present invention relates to a light emitting display device, and more particularly, to a light emitting display device capable of preventing a boundary between pixel groups from being visible when driving units of pixel groups.

BACKGROUND ART

Currently, as it enters a full-scale information era, a field of a display device which visually expresses electrical information signals has been rapidly developed and studies are continued to improve performances of various display devices such as a thin-thickness, a light weight, and low power consumption.

Among various display devices, a light emitting display device is a self-light emitting display device, and can be manufactured to be light and thin since it does not require a separate light source, unlike a liquid crystal display device. In addition, since the light emitting display device is advantageous in terms of power consumption due to a low voltage driving, and is also excellent in terms of a color implementation, a response speed, a viewing angle, and a contrast ratio (CR), it is expected to be utilized in various fields.

DISCLOSURE

Technical Problem

A light emitting display device may be driven in such a manner that pixels emit light in units of rows in response to scan signals applied in units of rows. However, recently, in order to realize the efficiency and high luminance of light emitting elements, a driving method in which all pixels are grouped in a specific number of row units and simultaneously emit light in units of pixel groups is also used.

However, the inventors of the present invention have recognized a problem in that, when a driving method of allowing pixels to simultaneously emit light in units of pixel groups is used, dark lines or bright lines at boundaries between the pixel groups are visible to a user. Specifically, even if a falling time and a rising time of an emission signal for neighboring pixel groups are the same point in time, as an emission signal line that transmits the emission signal and a high potential voltage line cross each other, a ripple may occur in high potential voltage which is transmitted by the high potential voltage line due to a falling or rising of the emission signal which is transmitted by the emission signal line. Due to a ripple phenomenon of the high potential voltage, a dark line or a bright line may be visible at a boundary between pixel groups.

Accordingly, the inventors of the present invention have invented a new light emitting display device capable of preventing a boundary between pixel groups from being visible when driving units of pixel groups.

An object of the present invention is to provide a light emitting display device capable of solving that dark lines or bright lines are visible at a boundary between pixel groups when driving units of pixel groups.

In addition, another object of the present invention is to provide a light emitting display device capable of preventing the occurrence of a luminance deviation at a boundary of pixel groups when a display panel configured to drive pixels disposed in an odd-numbered row or to drive pixels disposed in an even-numbered row is used.

Objects of the present disclosure are not limited to the above-mentioned objects, and other objects, which are not mentioned above, can be clearly understood by those skilled in the art from the following descriptions.

Technical Solution

A light emitting display device according to an embodiment of the present invention includes a display panel including a first pixel group including a plurality of pixels in 2N rows, and a second pixel group disposed subsequent to the first pixel group and including a plurality of pixels in 2N rows; and an emission signal unit including a first emission stage for applying the same first emission signal to the first pixel group and a second emission stage for applying the same second emission signal to the second pixel group, wherein in a first frame, a falling time of the first emission signal and a rising time of the second emission signal are different from each other, wherein the falling time of the first emission signal is a time at which the first emission signal is inverted from a high voltage to a low voltage, wherein the rising time of the second emission signal is a time at which the second emission signal is inverted from a low voltage to a high voltage.

A light emitting display device according to another embodiment of the present invention includes a display panel including a plurality of pixel groups in which a plurality of pixels are grouped in units of a plurality of rows, the display panel being configured to drive pixels in an odd-numbered row or to drive pixels in an even-numbered row; and a gate driver including a scan signal unit for applying a scan signal to the plurality of pixels and an emission signal unit for applying an emission signal to the plurality of pixels, wherein the emission signal unit is configured to apply the same emission signal to pixels included in the same pixel group among the plurality of pixels, wherein in a first frame and a second frame, a time at which a first emission signal that is applied to a first pixel group among the plurality of pixel groups is inverted from a gate-off voltage to a gate-on voltage, and a time at which a second emission signal that is applied to a second pixel group among the plurality of pixel groups is inverted from the gate-on voltage to the gate-off voltage differ from each other, so that the display panel is configured to alternately display the first frame in which dark lines are visible and the second frame in which bright lines are visible at a boundary between the plurality of pixel groups.

Other detailed matters of the exemplary embodiments are included in the detailed description and the drawings.

Advantageous Effects

According to the present invention, when a plurality of pixels are driven in a group unit, a luminance deviation capable of occurring at a boundary of pixel groups can be improved.

In addition, according to the present invention, a phenomenon in which dark lines or bright lines at a boundary between pixel groups are visible to a user can be prevented.

Effects according to the present invention are not limited by the contents exemplified above, and more various effects are included in the present invention.

MODES OF THE INVENTION

Figure 1:
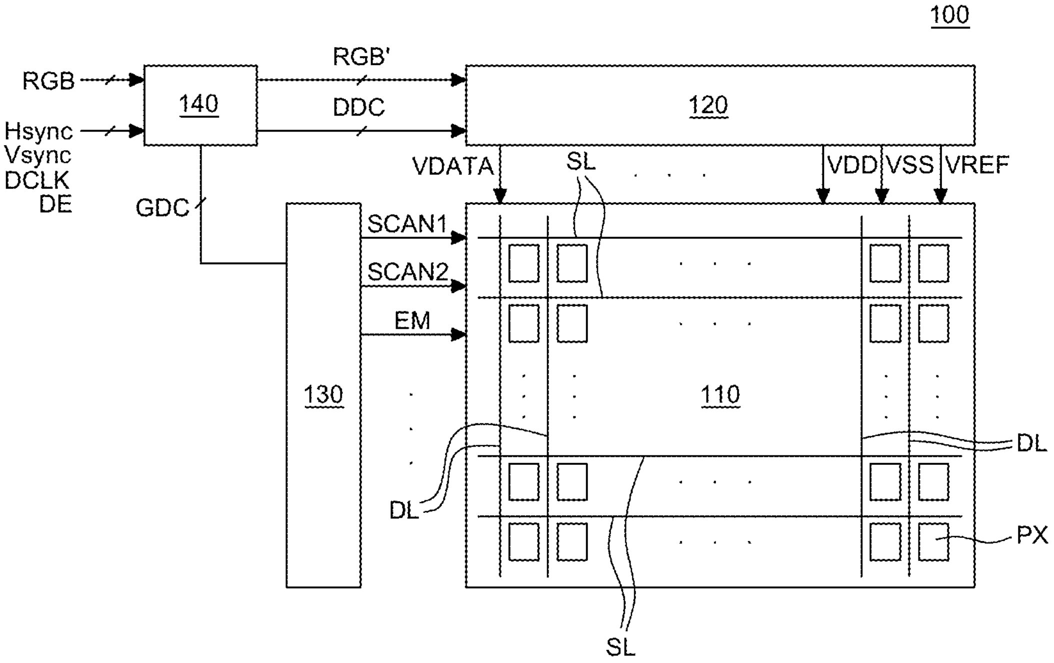
FIG. 1 is a schematic diagram of a light emitting display device according to an embodiment of the present invention.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly".

When an element or layer is referred to as being "on" another element or layer, it may be directly on the other element or layer, or intervening elements or layers may be present.

Although the terms "first", "second", and the like are used for describing various components, these components are not confined by these terms. These terms are merely used for distinguishing one component from the other components. Therefore, a first component to be mentioned below may be a second component in a technical concept of the present invention.

Throughout the whole specification, the same reference numerals denote the same elements.

Since a size and thickness of each component illustrated in the drawings are represented for convenience in explanation, the present invention is not necessarily limited to the illustrated size and thickness of the component.

The features of various embodiments of the present disclosure can be partially or entirely adhered to or combined with each other and can be interlocked and operated in technically various ways, and the embodiments can be carried out independently of or in association with each other.

Hereinafter, a display device according to exemplary embodiments of the present disclosure will be described in detail with reference to accompanying drawings.

FIG. 1 is a schematic diagram of a light emitting display device according to an embodiment of the present invention. Referring to FIG. 1, the light emitting display device includes a display panel 110, a data driver 120, a gate driver 130, and a timing controller 140.

Referring to FIG. 1, the display panel 110 is a panel for displaying an image. The display panel 110 may include various circuits, lines, and light emitting elements that are disposed on a substrate. The display panel 110 is divided by a plurality of data lines DL and a plurality of scan lines SL that cross each other, and may include a plurality of pixels PX that are connected to the plurality of data lines DL and the plurality of scan lines SL. The display panel 110 may include a display area that is defined by the plurality of pixels PX and a non-display area in which various signal lines or pads and the like are formed. The display panel 110 may be implemented as a display panel that is used in various light emitting display devices, such as a liquid crystal display device, an organic light emitting display device, an electrophoretic display device, an inorganic light emitting display device using an LED and the like. Hereinafter, it will be described that the display panel 110 is a panel used in an inorganic light emitting display device using an LED, but is not limited thereto.

The timing controller 140 may receive timing signals such as a vertical synchronization signal, a horizontal synchronization signal, a data enable signal, a dot clock and the like, and digital video data RGB through a receiving circuit such as an LVDS or TMDS interface that is connected to a host system. The timing controller 140 may provide a data control signal DDC to the data driver 120 and provide a gate control signal GDC to the gate driver 130 based on the timing signal input thereto. Also, the timing controller 140 may rearrange the digital video data RGB in accordance with a resolution of the display panel 110 and provide rearranged digital video data RGB' to the data driver 120.

The data driver 120 supplies data voltage VDATA to a plurality of sub-pixels SP. The data driver 120 may include a plurality of source drive integrated circuits (ICs). The plurality of source drive ICs may receive the digital video data RGB' and the data control signal DDC from the timing controller 140. The plurality of source drive ICs may generate the data voltage VDATA by converting the digital video data RGB' into a gamma voltage in response to the data control signal DDC, and supply the data voltage VDATA through the data lines DL of the display panel 110. In addition, various voltages such as a high potential voltage VDD, a low potential voltage VSS, a reference voltage VREF and the like for driving the plurality of pixels PX may be transmitted through the data driver 120, and may be transmitted through other components. The plurality of source drive ICs may be connected to the data lines DL of the display panel 110 by a chip on glass (COG) process or a tape automated bonding (TAB) process. Also, the source drive ICs may be formed on the display panel 110 or may be in a form in which it is formed on a separate PCB substrate and connected to the display panel 110.

The gate driver 130 supplies scan signals SCAN1 and SCNA2 and an emission signal EM to the plurality of pixels PX. The gate driver 130 may include a level shifter and a shift register. The level shifter may shift a level of a clock signal which is input as a transistor-transistor-logic (TTL) level from the timing controller 140 and then, supply it to the shift register. The shift register may be formed in the non-display area of the display panel 110 by the GIP method, but is not limited thereto. The shift register may be configured of a plurality of stages that shift and output the scan signals SCAN1 and SCNA2 and the emission signal EM in response to the clock signal and a driving signal. The plurality of stages included in the shift register may sequentially output the scan signals SCAN1 and SCNA2 and the emission signal EM through a plurality of output terminals. Although it is illustrated in FIG. 1 that the gate driver 130 outputs two scan signals SCAN1 and SCNA2 and the emission signal EM, the number of scan signals SCAN1 and SCNA2 is not limited thereto.

Figure 2:
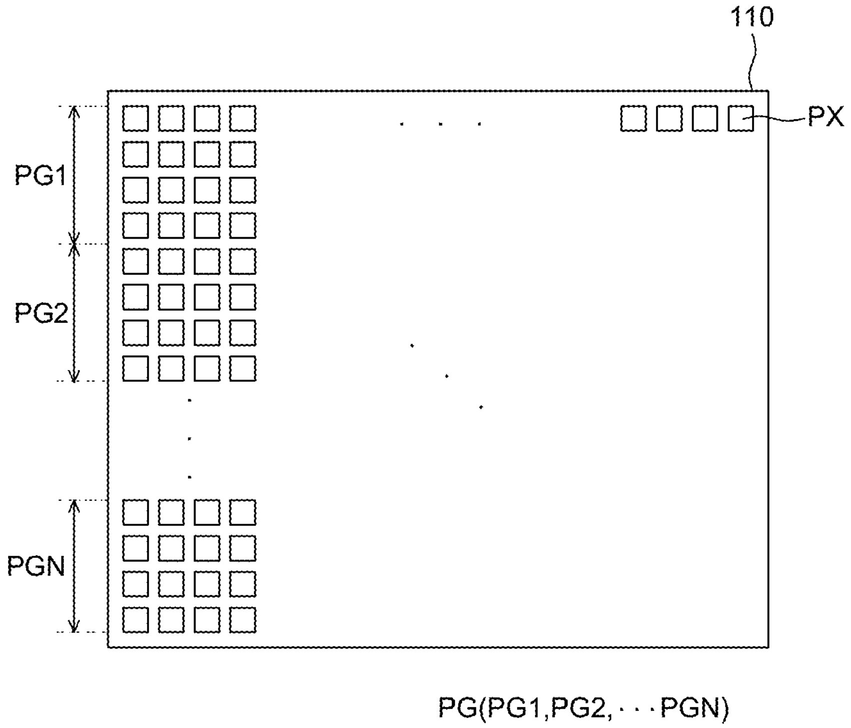
FIG. 2 is a schematic diagram of a display panel of the light emitting display device according to an embodiment of the present invention.

Hereinafter, FIG. 2 is referred together for a more detailed description of the plurality of pixels PX of the display panel 110.

FIG. 2 is a schematic diagram of a display panel of the light emitting display device according to an embodiment of the present invention. In FIG. 2, only the plurality of pixels PX of the display panel 110 are illustrated for convenience of explanation.

Referring to FIG. 2, the display panel 110 may include the plurality of pixels PX. The plurality of pixels PX may be pixels for emitting different colors, and a plurality of LEDs may be disposed therein. For example, the plurality of pixels PX may include a red pixel, a green pixel, and a blue pixel, but are not limited thereto.

The plurality of pixels PX may be grouped into a plurality of pixel groups PG. That is, the plurality of pixels PX may be grouped into a plurality of row units to configure the plurality of pixel groups PG. Each of the plurality of pixel groups PG may be configured of a plurality of pixels PX in 2N rows, that is, a plurality of pixels PX in even number of rows. The plurality of pixel groups PG may be configured of, for example, N pixel groups PG. In this case, it may be assumed that a first pixel group PG1 is positioned at an uppermost end of the display panel 110 and an Nth pixel group PGN is positioned at a lowermost end of the display panel 110, and it may be defined that a second pixel group PG2 may be disposed subsequent to the first pixel group PG1.

The display panel 110 may be configured to drive the pixels PX in odd-numbered rows or to drive the pixels PX in even-numbered rows among the plurality of pixels PX. That is, the display panel 110 may selectively drive the pixels PX in an odd-numbered row or the pixels PX in an even-numbered row among the plurality of pixels PX disposed in the same column. Also, for example, as described above, when a light emitting display device 100 is an inorganic light emitting display device 100 using an LED, in order to prepare for a transfer failure of the LED, the pixels PX in odd-numbered rows may be defined as main pixels and the pixels PX in even-numbered rows may be defined as redundancy pixels. That is, when no defect occurs in the main pixels, the main pixels, that is, the pixels PX in odd-numbered rows, may be driven when the light emitting display device 100 is driven, and when a defect occurs in the main pixels, the redundancy pixels, that is, the pixels PX in even-numbered rows may be driven when the light emitting display device 100 is driven. However, this is exemplary, and the display panel 110 may selectively drive the pixels PX in odd-numbered rows or the pixels PX in even-numbered rows among the plurality of pixels PX disposed in the same column for various purposes according to the design of the display panel 110.

Figure 3:
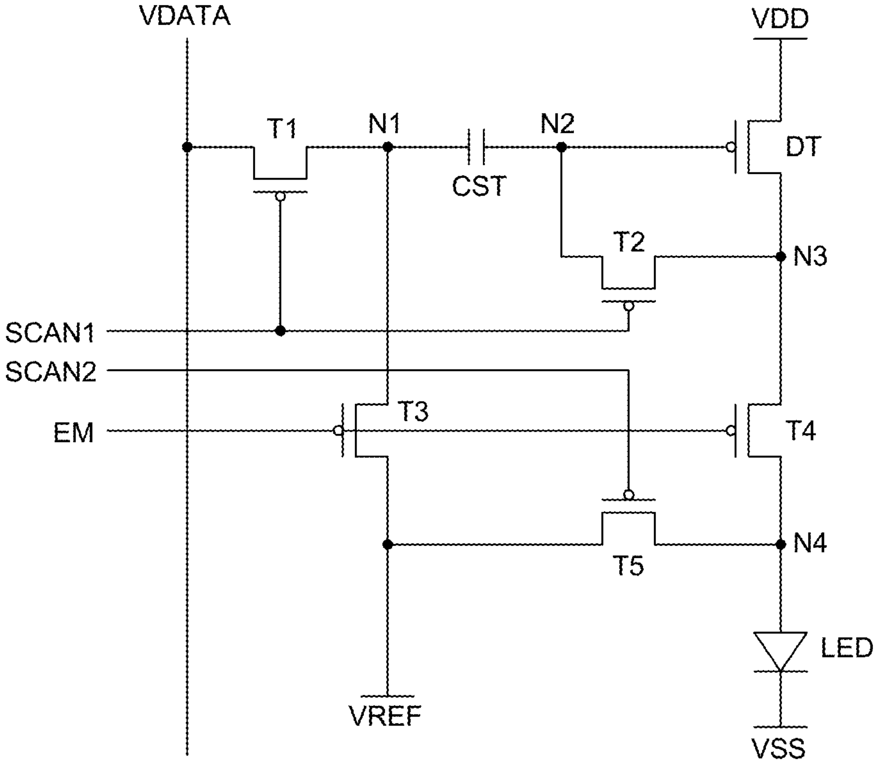
FIG. 3 is a circuit diagram of a pixel circuit of one pixel of the light emitting display device according to an embodiment of the present invention.

Hereinafter, FIG. 3 is referred together for a more detailed description of pixel circuits disposed in the plurality of pixels PX of the display panel 110.

FIG. 3 is a circuit diagram of a pixel circuit of one pixel of the light emitting display device according to an embodiment of the present invention. Although FIG. 3 illustrates that the pixel circuit disposed in one pixel PX is a 6T1C pixel circuit structure configured of six transistors and one capacitor, this is exemplary, and the number of transistors and the number of capacitors constituting the pixel circuit are not limited thereto.

Referring to FIG. 3, one pixel circuit includes a first transistor T1, a second transistor T2, a third transistor T3, a fourth transistor T4, a fifth transistor T5, a driving transistor DT, a storage capacitor CST, and a light emitting element LED.

The light emitting element LED emits light by a driving current supplied from the driving transistor DT. An anode of the light emitting element LED is connected to a fourth node N4, and a cathode of the light emitting element LED is connected to an input terminal of a low potential voltage VSS.

The driving transistor DT controls a driving current that is applied to the light emitting element LED according to a voltage Vsg between a source electrode and a gate electrode thereof. The source electrode of the driving transistor DT is connected to an input terminal of a high potential voltage VDD and the gate electrode thereof is connected to a second node N2, and a drain electrode thereof is connected to a third node N3.

The first transistor T1 includes a gate electrode connected to an input terminal of a first scan signal SCAN1, a source electrode connected to the data line DL supplying the data voltage VDATA, and a drain electrode connected to a first node N1. The first transistor T1 may apply the data voltage VDATA supplied from the data line DL to the first node N1 in response to the first scan signal SCAN1.

The second transistor T2 includes a source electrode connected to the third node N3, a drain electrode connected to the second node N2, and a gate electrode connected to the input terminal of the first scan signal SCAN1. The second transistor T2 may diode-connect the gate electrode and the drain electrode of the driving transistor DT in response to the first scan signal SCAN1.

The third transistor T3 includes a gate electrode connected to an emission signal EM input terminal, a source electrode connected to the first node N1, and a drain electrode connected to a reference voltage VREF input terminal. The third transistor T3 may apply a reference voltage VREF to the first node N1 in response to the emission signal EM.

The fourth transistor T4 includes a source electrode connected to the third node N3, a drain electrode connected to the fourth node N4, and a gate electrode connected to the emission signal EM input terminal. The fourth transistor T4 forms a current path between the third node N3 and the fourth node N4 in response to the emission signal EM.

The fifth transistor T5 includes a drain electrode connected to the fourth node N4, a source electrode connected to the reference voltage VREF input terminal, and a gate electrode connected to a second scan signal SCAN2 input terminal. The fifth transistor T5 may apply the reference voltage VREF to the fourth node N4 in response to a second scan signal SCAN2.

The storage capacitor CST includes a first electrode connected to the first node N1 and a second electrode connected to the second node N2.

In the light emitting display device 100, one frame period may be divided into an initial period, a sampling period, and an emission period. The initial period is a period in which a gate voltage of the driving transistor DT is initiated. The sampling period is a period in which a voltage of the anode of the light emitting element LED is initialized and a threshold voltage of the driving transistor DT is sampled and stored in the second node N2. The emission period is a period in which a voltage between the source electrode and a gate electrode of the driving transistor DT is programmed including the sampled threshold voltage, and the light emitting element LED emits light with a driving current according to the programmed voltage.

Here, during the emission period, the emission signal EM is inverted to a gate-on voltage. That is, the emission signal EM falls into the gate-on voltage. Accordingly, the fourth transistor T4 is turned on by the emission signal EM, and a driving current for driving the light emitting element LED is applied to the light emitting element LED via the fourth node N4. Accordingly, the light emitting element LED may emit light during the emission period. In this specification, although it is described that a gate-on voltage is a gate-low voltage and a gate-off voltage is a gate-high voltage, depending on types of transistors, the gate-on voltage may be a gate-high voltage and the gate-off voltage may be a gate-low voltage.

In the light emitting display device 100 according to an embodiment of the present invention, the plurality of pixels PX are driven in units of pixel groups PG. That is, the emission signal EM at the same timing is applied to the pixels PX included in the same pixel group PG. This will be described in more detail with reference to FIGS. 4 and 5.

Figure 4:
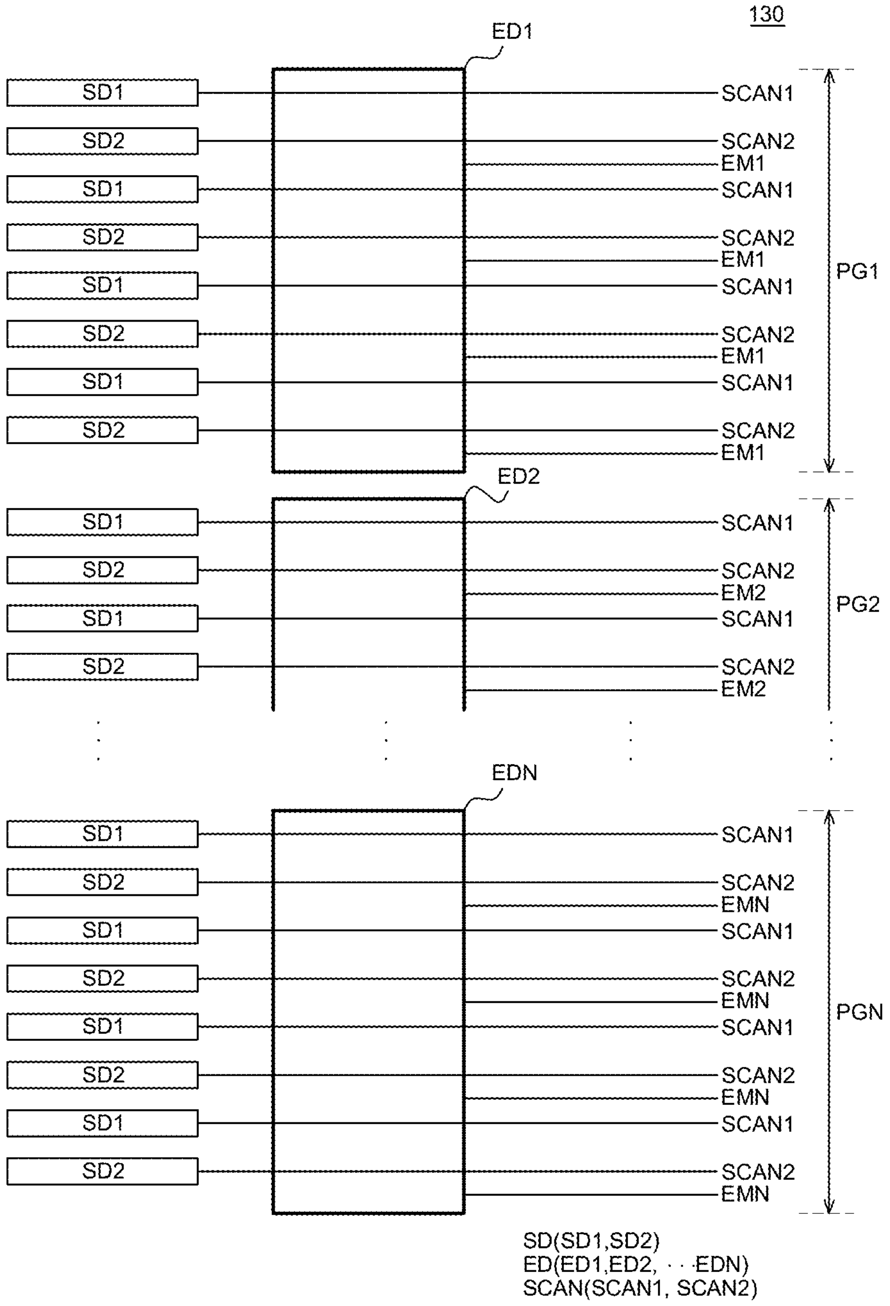
FIG. 4 is a schematic diagram of a gate driver of the light emitting display device according to an embodiment of the present invention.
Figure 5:
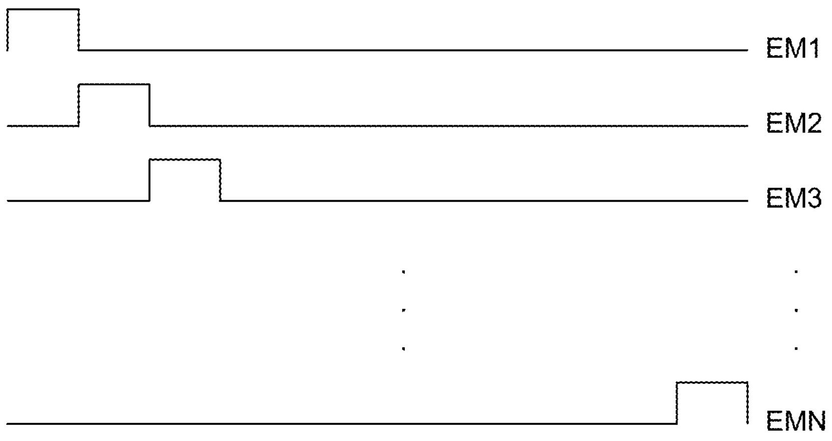
FIG. 5 is a timing diagram for an emission signal of the light emitting display device according to an embodiment of the present invention.

FIG. 4 is a schematic diagram of a gate driver of the light emitting display device according to an embodiment of the present invention. FIG. 5 is a timing diagram for an emission signal of the light emitting display device according to an embodiment of the present invention.

Referring to FIG. 4, the gate driver 130 includes a scan signal unit SD and an emission signal unit ED.

The scan signal unit SD applies the scan signals SCAN to the plurality of pixels PX. The scan signal unit SD may include a plurality of scan stages for outputting the scan signals SCAN. The plurality of scan stages may include a plurality of first scan stages SD1 that are configured to output the first scan signal SCAN1 and a plurality of second scan stages SD2 that are configured to output the second scan signal SCAN2. The plurality of first scan stages SD1 may each output the first scan signal SCAN1 for one row, and the plurality of second scan stages SD2 may each output the second scan signal SCAN2 for one row. Accordingly, a pair of the first scan stage SD1 and the second scan stage SD2 may output the first scan signal SCAN1 and the second scan signal SCAN2 for one row.

The emission signal unit ED applies the emission signal EM to the plurality of pixels PX. The emission signal unit ED may include a plurality of emission stages for outputting the emission signal EM to each of the pixel groups PG. Specifically, the plurality of emission stages may include a first emission stage ED1 that is configured to output a first emission signal EM1 to the plurality of pixels PX included in the first pixel group PG1, and a second emission stage ED2 that is configured to output a second emission signal EM2 to the plurality of pixels PX included in the second pixel group PG2, and may include an Nth emission stage EDN that is configured to output an Nth emission signal EMN to the plurality of pixels PX included in an Nth pixel group PGN. That is, the emission signal unit ED may output a total of N emission signals EM1, EM2, . . . EMN.

The emission signal unit ED including the plurality of emission stages may apply the same emission signal EM to the pixels PX included in the same pixel group PG among the plurality of pixels PX. That is, the first emission signal EM1 may be equally applied to the pixels PX included in the first pixel group PG1 through the first emission stage ED1, and the second emission signal EM2 may be equally applied to the pixels PX included in the second pixel group PG2 through the second emission stage ED2.

Referring to FIG. 5 together for a more detailed description of the emission signals EM output by the emission signal unit ED, in the case of the pixels PX of the first pixel group PG1 to which the same first emission signals EM1 are applied through the first emission stage ED1, they may emit light all together during a period in which the first emission signal EM1 is a gate-on voltage. Next, in the case of the pixels PX of the second pixel group PG2 to which the same second emission signals EM2 are applied through the second emission stage ED2, they may emit light all together during a period in which the second emission signal EM2 is a gate-on voltage. Also, since the second emission signal EM2 is delayed than the first emission signal EM1 by a predetermined time, the pixels PX of the second pixel group PG2 may emit light with being delayed than the pixels PX of the first pixel group PG1 by a predetermined time. Next, in the case of the pixels PX of a third pixel group PG3 to which the same third emission signals EM3 are applied through a third emission stage, they may emit light all together during a period in which the third emission signal EM3 is a gate-on voltage. In addition, since the third emission signal EM3 is delayed than the second emission signal EM2 by a predetermined time, the pixels PX of the third pixel group PG3 may emit light with being delayed than the pixels PX of the second pixel group PG2 by a predetermined time.

As described above, when the emission signal unit ED emits light in group units of the plurality of pixel groups PG, a luminance deviation may occur at a boundary between the pixel groups PG. This will be described in more detail with reference to FIGS. 6A to 6C.

Figure 6A:
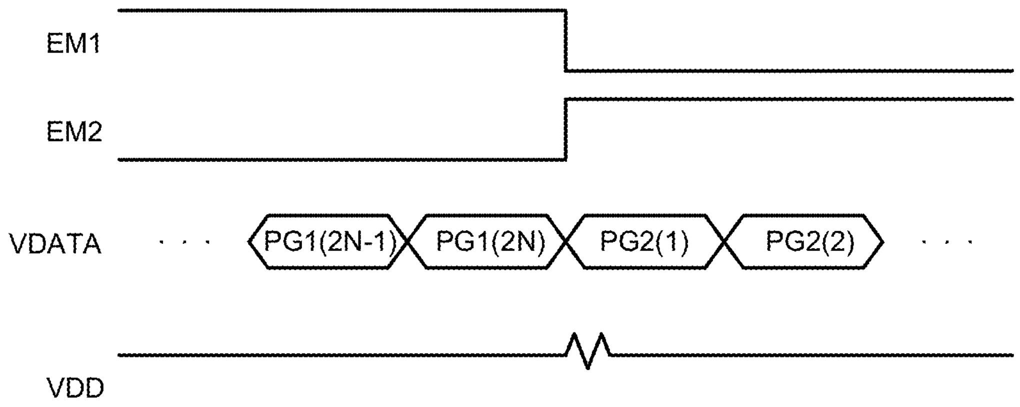
FIG. 6A is a timing diagram in a comparative example.
Figure 6B:
FIG. 6B is a diagram for one frame when pixels in an odd-numbered row are driven in the comparative example.
Figure 6C:
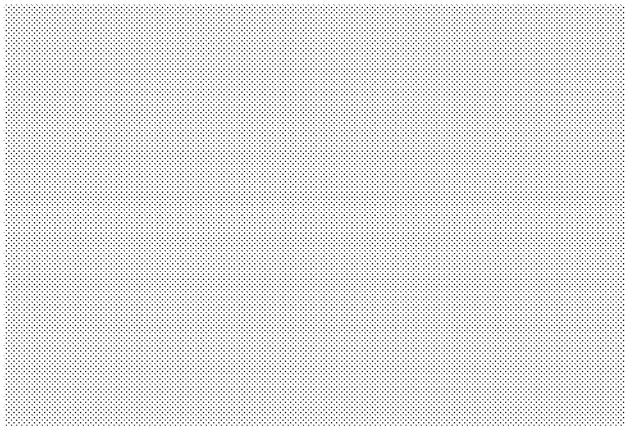
FIG. 6C is a diagram for one frame when pixels in an even-numbered row are driven in the comparative example.

FIG. 6A is a timing diagram in a comparative example. FIG. 6B is a diagram for one frame when pixels in an odd-numbered row are driven in the comparative example. FIG. 6C is a diagram for one frame when pixels in an even-numbered row are driven in the comparative example. FIG. 6A is a timing diagram for emission signals EM1 and EM2, a data voltage VDATA and a high potential voltage VDD for last two rows of the first pixel group PG1 which is configured of 2N rows and first two rows of the second pixel group PG2 in the comparative example. FIGS. 6B and 6C are diagrams illustrating states in which frames expressing colors of specific grayscales are displayed, in which dark lines are shown in black and bright lines are shown in white. The following description is a description of the comparative example, but for convenience of explanation, components using the same reference numerals as those of the light emitting display device 100 according to an embodiment of the present invention exist.

In the case of a general light emitting display device such as the comparative example, as shown in FIG. 6A, a time at which the first emission signal EM1 is inverted from a gate-off signal to a gate-on signal, that is, a falling time of the first emission signal EM1 at which the first emission signal EM1 is inverted from a high voltage to a low voltage, and a time at which the second emission signal EM2 is inverted from the gate-on signal to the gate-off signal, that is, a rising time of the second emission signal EM2 at which the second emission signal EM2 is inverted from the low voltage to the high voltage, may be identical to each other. That is, both the falling time of the first emission signal EM1 and the rising time of the second emission signal EM2 may be identical to a start time of a data signal application time period for a first row PG2(1) of the second pixel group PG2.

In this manner, when the falling time of the first emission signal EM1 and the rising time of the second emission signal EM2 are identical to the start time of the data signal application time period for the first row PG2(1) of the second pixel group PG2, a ripple may occur in the high potential voltage VDD at the start time of the data signal application time period for the first row PG2(1) of the second pixel group PG2. A plurality of emission signal lines that connect the emission signal unit ED and the plurality of pixels PX and transmit the emission signals EM from the emission signal unit ED to the plurality of pixels PX may generally extend in the same direction as the scan lines SL, and a plurality of high potential voltage lines that apply the high potential voltage VDD to the plurality of pixels PX may generally extend in the same direction as the data lines DL. Accordingly, the plurality of emission signal lines and the plurality of high potential voltage lines overlap and cross each other. As the emission signal lines and the high potential voltage lines cross each other as described above, when the emission signal EM that is transmitted through the emission signal line is inverted, a ripple may occur in the high potential voltage VDD that is transmitted through the high potential voltage line crossing the emission signal line. Accordingly, as shown in FIG. 6A, a ripple may occur in the high potential voltage VDD at the start time of the data signal application time period for the first row PG2(1) of the second pixel group PG2, at which the first emission signal EM1 falls and the second emission signal EM2 rises. Accordingly, in FIG. 6C that illustrates a case of driving the pixels PX in an even-numbered row among the plurality of pixels PX in a light emitting display device according to the comparative example, dark lines or bright lines may not be visible to a user, but in FIG. 6B that illustrates a case of driving the pixels PX in an odd-numbered row, dark lines may be visible to the user.

Figure 7A:
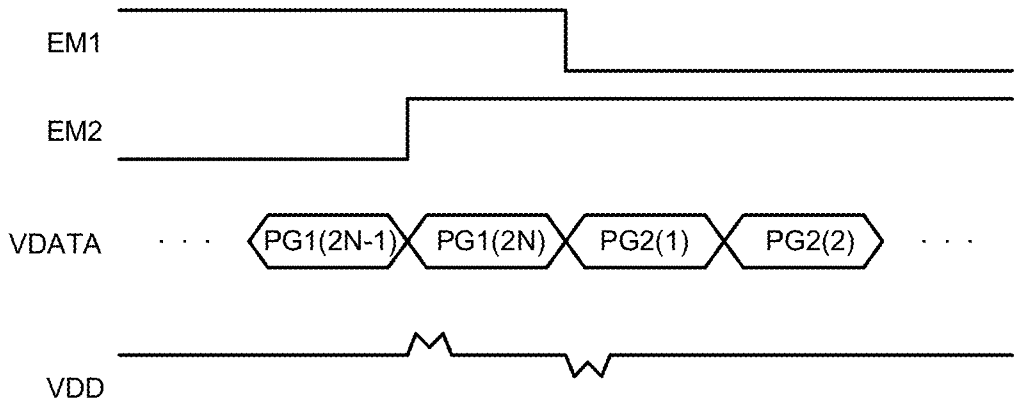
FIG. 7A is a timing diagram for a first frame of a light emitting display device according to an embodiment of the present invention.
Figure 7B:
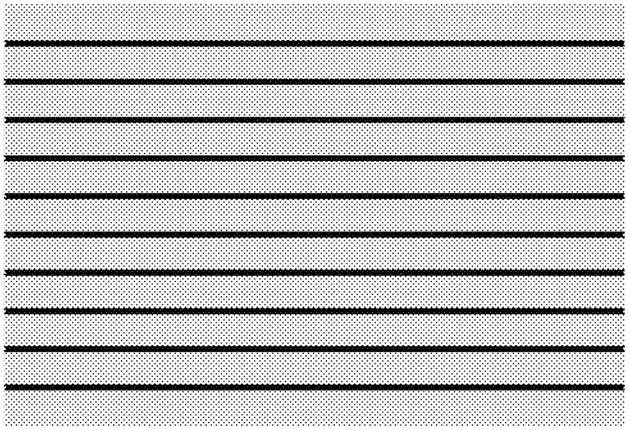
FIG. 7B is a diagram for the first frame when pixels in an odd-numbered row of the light emitting display device according to an embodiment of the present invention are driven.
Figure 7C:
FIG. 7C is a diagram for the first frame when pixels in an even-numbered row of a light emitting display device according to an embodiment of the present invention are driven.

Accordingly, the inventors of the present invention have invented a new light emitting display device capable of preventing a boundary between the pixel groups PG from being visible when driving units of pixel groups PG, and FIGS. 7A to 7C are referred together for a more detailed description of the light emitting display device 100 according to an embodiment of the present invention.

FIG. 7A is a timing diagram for a first frame of a light emitting display device according to an embodiment of the present invention. FIG. 7B is a diagram for the first frame when pixels in an odd-numbered row of the light emitting display device according to an embodiment of the present invention are driven. FIG. 7C is a diagram for the first frame when pixels in an even-numbered row of a light emitting display device according to an embodiment of the present invention are driven. FIG. 7A is a timing diagram for emission signals EM1 and EM2, a data voltage VDATA and a high potential voltage VDD for last two rows of the first pixel group PG1 and first two rows of the second pixel group PG2 that is a pixel group PG immediately subsequent to the first pixel group PG1, in relation to a time at which the light emitting display device 100 according to an embodiment of the present invention expresses the first frame. FIGS. 7B and 7C are diagrams illustrating states in which frames expressing colors of specific grayscales are displayed, in which dark lines are shown in black and bright lines are shown in white.

In the light emitting display device 100 according to an embodiment of the present invention, in order to prevent a boundary between the pixel groups PG from being visible when a unit of pixel groups PG is driven, a falling time and a rising time of the emission signal EM for the pixel groups PG adjacent to each other may be different from each other. Also, in the light emitting display device 100 according to an embodiment of the present invention, a plurality of frames in which the falling time and the rising time of the emission signal EM are different may be alternately displayed. For example, the display panel 110 may be configured to alternately display one frame where a dark line is visible and another frame where a bright line is visible at a boundary between the plurality of pixel groups PG. That is, a falling time of the first emission signal EM1 which is applied to the first pixel group PG1 in one frame may be different from a falling time of the first emission signal EM1 which is applied to the first pixel group PG1 in another frame. In addition, a rising time of the second emission signal EM2 which is applied to the second pixel group PG2 that is a pixel group PG immediately subsequent to the first pixel group PG1 in one frame, and a rising time of the second emission signal EM2 which is applied to the second pixel group PG2 in another frame may be different from each other.

Referring to FIG. 7A for a more detailed description, in the first frame, the falling time of the first emission signal EM1 may be different from the rising time of the second emission signal EM2. In this case, in the first frame, the falling time of the first emission signal EM1 may be slower than the rising time of the second emission signal EM2. Specifically, in the first frame, the falling time of the first emission signal EM1 may be identical to the start time of the data signal application time period for the first row PG2(1) of the second pixel group PG2, and in the first frame, the rising time of the second emission signal EM2 may be identical to a start time of a data signal application time period for a last row PG1(2N) of the first pixel group PG1. In FIG. 7A, for convenience of explanation, it is described based on the first emission signal EM1 which is applied to the first pixel group PG1 and the second emission signal EM2 which is applied to the second pixel group PG2, but both the falling time and the rising time of the emission signal EM as described above may be applied to the emission signal EM which is applied to two pixel groups PG adjacent to each other.

As the emission signal unit ED applies the first emission signal EM1 and the second emission signal EM2 that have the falling time and the rising time as described above, in the first frame, a dark line or a bright line may be visible to the user.

First, referring to FIG. 7B, when the pixels PX in an odd-numbered row of the light emitting display device 100 are driven, a dark line may be visible at a boundary between the pixel groups PG adjacent to each other. Referring to FIG. 7A, in the first frame, the falling time of the first emission signal EM1 may be identical to the start time of the data signal application time period for the first row PG2(1) of the second pixel group PG2. Accordingly, a ripple may occur in the high potential voltage VDD which is transmitted through the high potential voltage line overlapping the emission signal line due to a falling of the first emission signal EM1, and the high potential voltage VDD may have a momentarily low value by the ripple. Accordingly, a high potential voltage VDD which is relatively low may be applied to a position corresponding to a boundary between the first pixel group PG1 and the second pixel group PG2, that is, a position corresponding to the first row PG2(1) of the second pixel group PG2. Accordingly, the position corresponding to the boundary between the first pixel group PG1 and the second pixel group PG2 has a luminance decreased than that of surroundings thereof, which may be visible to a user as a dark line.

Next, referring to FIG. 7C, when the pixels PX in an even-numbered row of the light emitting display device 100 are driven, a bright line may be visible at a boundary between the pixel groups PG adjacent to each other. Referring to FIG. 7A, in the first frame, the rising time of the second emission signal EM2 may be identical to a start time of a data signal application time period for the last row PG1(2N) of the first pixel group PG1. Accordingly, a ripple may occur in the high potential voltage VDD which is transmitted through the high potential voltage line overlapping the emission signal line due to a rising of the second emission signal EM2, and the high potential voltage VDD may have a momentarily high value by the ripple. Accordingly, a high potential voltage VDD which is relatively high may be applied to a position corresponding to the boundary between the first pixel group PG1 and the second pixel group PG2, that is, a position corresponding to the last row PG1(2N) of the first pixel group PG1. Accordingly, the position corresponding to the boundary between the first pixel group PG1 and the second pixel group PG2 has a luminance increased than that of surroundings thereof, which may be visible to a user as a bright line.

Figure 8A:
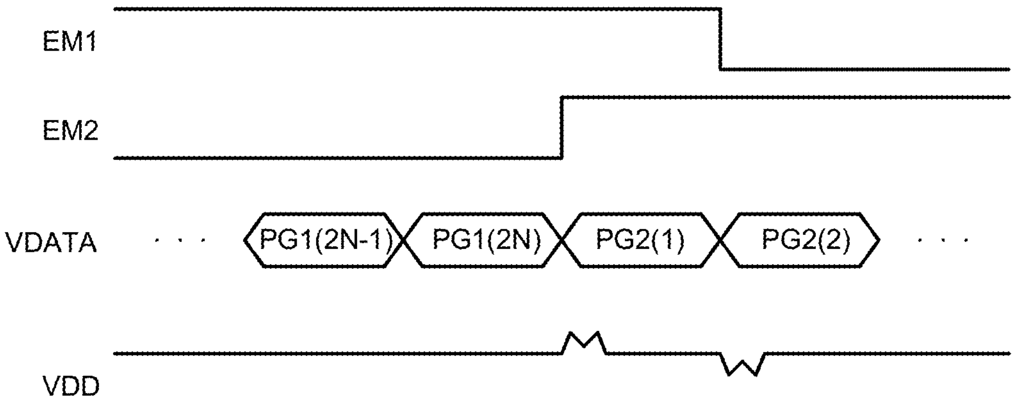
FIG. 8A is a timing diagram for a second frame of a light emitting display device according to an embodiment of the present invention.
Figure 8B:
FIG. 8B is a diagram for the second frame when pixels in an odd-numbered row of the light emitting display device according to an embodiment of the present invention are driven.
Figure 8C:
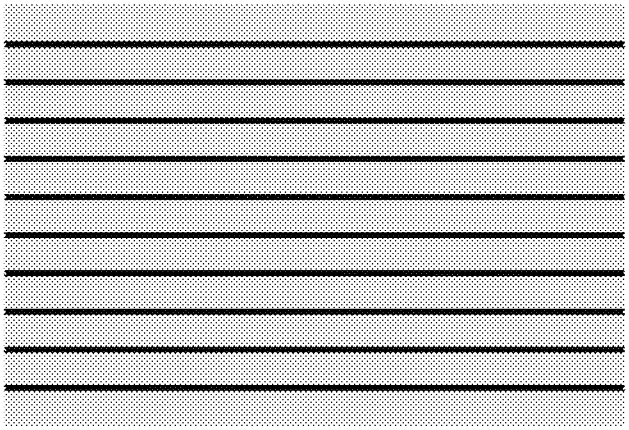
FIG. 8C is a diagram for the second frame when pixels in an even-numbered row of the light emitting display device according to an embodiment of the present invention are driven.

FIG. 8A is a timing diagram for a second frame of a light emitting display device according to an embodiment of the present invention. FIG. 8B is a diagram for the second frame when pixels in an odd-numbered row of the light emitting display device according to an embodiment of the present invention are driven. FIG. 8C is a diagram for the second frame when pixels in an even-numbered row of the light emitting display device according to an embodiment of the present invention are driven. FIG. 8A is a timing diagram for emission signals EM1 and EM2, a data voltage VDATA and a high potential voltage VDD for last two rows of the first pixel group PG1 and first two rows of the second pixel group PG2 that is a pixel group PG immediately subsequent to the first pixel group PG1, in relation to a time at which the light emitting display device 100 according to an embodiment of the present invention expresses the second frame. FIGS. 8B and 8C are diagrams illustrating states in which frames expressing colors of specific grayscales are displayed, in which dark lines are shown in black and bright lines are shown in white.

Referring to FIG. 8A, in the second frame, the falling time of the first emission signal EM1 may be different from the rising time of the second emission signal EM2. In this case, in the second frame, the falling time of the first emission signal EM1 may be slower than the rising time of the second emission signal EM2. Specifically, in the second frame, the falling time of the first emission signal EM1 may be identical to a start time of a data signal application time period for a second row PG2(2) of the second pixel group PG2, and in the second frame, the rising time of the second emission signal EM2 may be identical to the start time of the data signal application time period for the first row PG2(1) of the second pixel group PG2. In FIG. 8A, for convenience of explanation, it is described based on the first emission signal EM1 which is applied to the first pixel group PG1 and the second emission signal EM2 which is applied to the second pixel group PG2, but both the falling time and the rising time of the emission signal EM may be applied to the emission signal EM which is applied to two pixel groups PG adjacent to each other.

As the emission signal unit ED applies the first emission signal EM1 and the second emission signal EM2 that have the falling time and the rising time as described above, in the second frame, a dark line or a bright line may be visible to a user.

First, referring to 8B, when the pixels PX in an odd-numbered row of the light emitting display device 100 are driven, a bright line may be visible at the boundary between the pixel groups PG adjacent to each other. Referring to FIG. 8A, in the second frame, the rising time of the second emission signal EM2 may be identical to the start time of the data signal application time period for the first row PG2(1)

of the second pixel group PG2. Accordingly, a ripple may occur in the high potential voltage VDD which is transmitted through the high potential voltage line overlapping the emission signal line due to the rising of the second emission signal EM2, and the high potential voltage VDD may have a momentarily high value by the ripple. Thus, the high potential voltage VDD which is relatively high may be applied to a position corresponding to a boundary between the first pixel group PG1 and the second pixel group PG2, that is, a position corresponding to the first row PG2(1) of the second pixel group PG2. Accordingly, the position corresponding to the boundary between the first pixel group PG1 and the second pixel group PG2 has a luminance increased than that of surroundings thereof, which may be visible to a user as a bright line.

Next, referring to FIG. 8C, when the pixels PX in an even-numbered row, which are redundancy pixels of the light emitting display device 100, are driven, dark lines may be visible at boundaries between the pixel groups PG adjacent to each other. Referring to FIG. 8A, in the second frame, the falling time of the first emission signal EM1 may be identical to a start time of a data signal application time period for the second row PG2(2) of the second pixel group PG2. Accordingly, a ripple may occur in the high potential voltage VDD which is transmitted through the high potential voltage line overlapping the emission signal line due to the falling of the first emission signal EM1, and the high potential voltage VDD may have a momentarily low value by the ripple. Accordingly, when the pixels PX in an even-numbered row are driven, since a position corresponding to the second row PG2(2) of the second pixel group PG2 corresponds to a boundary between the first pixel group PG1 and the second pixel group PG2, the high potential voltage VDD which is relatively low may be applied to a position corresponding to the boundary between the first pixel group PG1 and the second pixel group PG2. Accordingly, the position corresponding to the boundary between the first pixel group PG1 and the second pixel group PG2 has a luminance decreased than that of a surrounding thereof, which may be visible to a user as a dark line.

In the light emitting display device 100 according to an embodiment of the present invention, in order to prevent a boundary between the pixel groups PG from being visible when a unit of pixel groups PG are driven, the falling time and the rising time of the emission signal EM for the pixel groups PG adjacent to each other may be different from each other. Also, in the light emitting display device 100 according to an embodiment of the present invention, a plurality of frames in which the falling time and the rising time of the emission signal EM are different may be alternately displayed. For example, the display panel 110 may be configured to alternately display one frame where a dark line is visible and another frame where a bright line is visible at a boundary between the plurality of pixel groups PG.

First, when the light emitting display device 100 drives the pixels PX in an odd-numbered row, the first emission stage ED1 of the emission signal unit ED may apply the first emission signal EM1 so that the falling time of the first emission signal EM1 is identical to the start time of the data signal application time period for the first row PG2(1) of the second pixel group PG2, in the first frame, and may apply the first emission signal EM1 so that the falling time of the first emission signal EM1 is identical to the start time of the data signal application time period for the second row PG2(2) of the second pixel group PG2, in the second frame. In addition, the second emission stage ED2 of the emission signal unit ED may apply the second emission signal EM2 so that the rising time of the second emission signal EM2 is identical to the start time of the data signal application time period for the last row PG1(2N) of the first pixel group PG1 in the first frame, and may apply the second emission signal EM2 so that the rising time of the second emission signal EM2 is identical to the start time of the data signal application time period for the first row PG2(1) of the second pixel group PG2 in the second frame. Also, the first emission stage ED1 and the second emission stage ED2 of the emission signal unit ED may apply the first emission signal EM1 and the second emission signal EM2 to alternately drive the first frame and the second frame. Accordingly, when the light emitting display device 100 drives pixels PX in an odd-numbered row, the first frame which is one frame where dark lines are visible, and the second frame which is another frame where bright lines are visible, may be alternately displayed. In this case, the first frame and the second frame are a frame in which dark lines are visible and a frame in which bright lines are visible, respectively, but the dark lines and bright lines are alternately displayed in a very short time at the boundaries between the adjacent pixel groups PG, so that effects in which the dark lines and bright lines are offset from each other are generated and thus, the dark lines and the bright lines at the boundaries between the pixel groups PG adjacent to each other may not be visible to a user.

In addition, when the light emitting display device 100 drives the pixels PX in an even-numbered row, the first emission stage ED1 of the emission signal unit ED may apply the first emission signal EM1 so that the falling time of the first emission signal EM1 is identical to the start time of the data signal application time period for the second row PG2(2) of the second pixel group PG2, in the first frame, and may apply the first emission signal EM1 so that the falling time of the first emission signal EM1 is identical to the start time of the data signal application time period for the first row PG2(1) of the second pixel group PG2, in the second frame. In addition, the second emission stage ED2 of the emission signal unit ED may apply the second emission signal EM2 so that the rising time of the second emission signal EM2 is identical to the start time of the data signal application time period for the first row PG2(1) of the second pixel group PG2 in the first frame, and may apply the second emission signal EM2 so that the rising time of the second emission signal EM2 is identical to the start time of the data signal application time period for the last row PG1(2N) of the first pixel group PG1 in the second frame. Also, the first emission stage ED1 and the second emission stage ED2 of the emission signal unit ED may apply the first emission signal EM1 and the second emission signal EM2 to alternately drive the first frame and the second frame. Accordingly, when the light emitting display device 100 drives pixels PX in an even-numbered row, the first frame which is one frame where dark lines are visible, and the second frame which is another frame where bright lines are visible, may be alternately displayed. In this case, the first frame and the second frame are a frame in which dark lines are visible and a frame in which bright lines are visible, respectively, but the dark lines and bright lines are alternately displayed in a very short time at the boundaries between the adjacent pixel groups PG, so that effects in which the dark lines and bright lines are offset from each other are generated and thus, the dark lines and the bright lines at the boundaries between the pixel groups PG adjacent to each other may not be visible to a user. Meanwhile, in FIGS. 7A to 8C, it is assumed that when the pixels PX in an even-numbered row are driven, the first frame is a frame in which bright lines are visible and the second frame is a frame in which dark lines are visible, but this is for convenience of explanation, and as in this paragraph, a frame in which dark lines are visible may be defined as a first frame, and a frame in which bright lines are visible may be defined as a second frame.

As described above, the display panel 110 of the light emitting display device 100 according to an embodiment of the present invention may be configured to alternately display one frame where dark lines are visible and another frame where bright lines are visible. Accordingly, in the light emitting display device 100 according to an embodiment of the present invention, a luminance deviation capable of occurring when the display panel 110 is implemented such that the plurality of pixels PX are grouped to emit light in units of pixel groups PG can be improved. A ripple may occur in the high potential voltage line overlapping the emission signal line in a process in which the emission signal EM falls or rises and accordingly, dark lines or bright lines occur at the boundaries of the pixel groups PG adjacent to each other and thus, can be visible to a user. Accordingly, the light emitting display device 100 according to an embodiment of the present invention may be configured such that one frame where dark lines are visible and another frame where bright lines are visible are alternately displayed, and thus, the dark lines and the bright lines can be offset from each other. Accordingly, dark lines and bright lines that actually occur may not be visible to a user and a luminance deviation capable of occurring at boundaries of the pixel groups PG when the plurality of pixels PX are driven in group units can be improved.

Figure 9A:
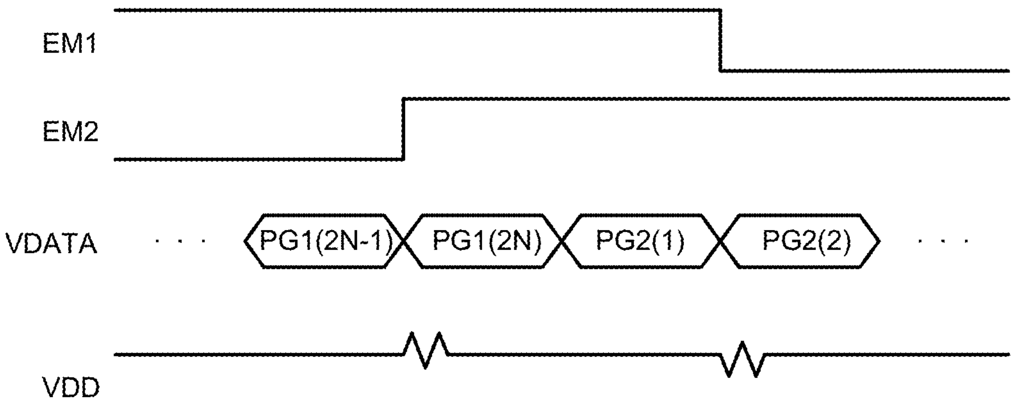
FIG. 9A is a timing diagram for a third frame of a light emitting display device according to another embodiment of the present invention.
Figure 9B:
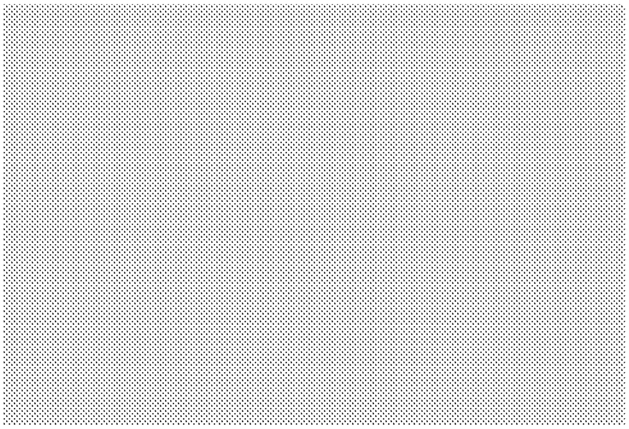
FIG. 9B is a diagram for the third frame when pixels in an odd-numbered row of the light emitting display device according to another embodiment of the present invention are driven.

FIG. 9A is a timing diagram for a third frame of a light emitting display device according to another embodiment of the present invention. FIG. 9B is a diagram for the third frame when pixels in an odd-numbered row of the light emitting display device according to another embodiment of the present invention are driven. FIG. 9A is a timing diagram for emission signals EM1 and EM2, a data voltage VDATA and a high potential voltage VDD for last two rows of the first pixel group PG1 and first two rows of the second pixel group PG2 that is a pixel group PG immediately subsequent to the first pixel group PG1, in relation to a time at which the light emitting display device according to another embodiment of the present invention expresses a third frame. FIG. 9B is a diagram illustrating a state in which a frame expressing a color of a specific grayscale is displayed, in which dark lines are shown in black and bright lines are shown in white. The light emitting display device according to another embodiment of the present invention described with reference to FIGS. 9A to 9B differs from the light emitting display device 100 according to an embodiment of the present invention described with reference to FIGS. 1 to 8C only in that it is a case where the pixels PX in an odd-numbered row are driven and the display panel 110 is configured to additionally display the third frame, but other components thereof are substantially the same, so a redundant description will be omitted.

The display panel 110 of the light emitting display device according to another embodiment of the present invention may drive the pixels PX in an odd-numbered row. In this case, the display panel 110 may be configured to alternately display the first frame, the second frame, and the third frame.

First, as described with reference to FIG. 7A, in the first frame, the falling time of the first emission signal EM1 may be identical to the start time of the data signal application time period for the first row PG2(1) of the second pixel group PG2. Next, as described with reference to FIG. 8A, in the second frame, the rising time of the second emission signal EM2 may be identical to the start time of the data signal application time period for the first row PG2(1) of the second pixel group PG2.

Referring to FIG. 9A for a more detailed description of the third frame, the falling time of the first emission signal EM1 may be different from the rising time of the second emission signal EM2 in the third frame. In this case, in the third frame, the falling time of the first emission signal EM1 may be slower than the rising time of the second emission signal EM2. Specifically, in the third frame, the falling time of the first emission signal EM1 may be identical to the start time of the data signal application time period for the second row PG2(2) of the second pixel group PG2, and in the third frame, the rising time of the second emission signal EM2 may be identical to the start time of the data signal application time period for the last row PG1(2N) of the first pixel group PG1.

Referring to FIG. 9B, when the pixels PX in an odd-numbered row of the light emitting display device are driven, both dark lines and bright lines may not be visible at boundaries between the pixel groups PG adjacent to each other in the third frame. Referring to FIG. 9A, in the third frame, the falling time of the first emission signal EM1 may be identical to the start time of the data signal application time period for the second row PG2(2) of the second pixel group PG2 and, in the third frame, the rising time of the second emission signal EM2 may be identical to the start time of the data signal application time period for the last row PG1(2N) of the first pixel group PG1. Accordingly, both the falling time of the first emission signal EM1 and the rising time of the second emission signal EM2 may be identical to a start time of a data signal application time period for the pixels PX in an even-numbered row. Accordingly, when the pixels PX in an odd-numbered row are driven, a ripple of the high potential voltage VDD due to the falling of the first emission signal EM1 and the rising of the second emission signal EM2 may not occur. Accordingly, as shown in FIG. 9B, dark lines and bright lines may not be visible to a user in the third frame.

The display panel 110 of the light emitting display device according to another embodiment of the present invention may be configured so that one frame where dark lines are visible, another frame where bright lines are visible, and still another frame where both dark lines and bright lines are not visible are alternately displayed. Accordingly, in the light emitting display device according to another embodiment of the present invention, a luminance deviation capable of occurring when the display panel 110 is implemented such that the plurality of pixels PX are grouped to emit light in units of pixel groups PG can be improved. A ripple may occur in the high potential voltage line overlapping the emission signal line in a process in which the emission signal EM falls or rises and accordingly, dark lines or bright lines occur at the boundaries of the pixel groups PG adjacent to each other and thus, can be visible to a user. Accordingly, in the light emitting display device according to another embodiment of the present invention, one frame where dark lines are visible and another frame where bright lines are visible are alternately displayed, and thus, the dark lines and the bright lines are offset from each other and at the same time, another frame where both dark lines and bright lines are not visible may be additionally alternated and displayed. Accordingly, dark lines and bright lines that actually occur may not be visible to a user and a luminance deviation capable of occurring at boundaries of the pixel groups PG when the plurality of pixels PX are driven in group units can be further improved.

Figure 10A:
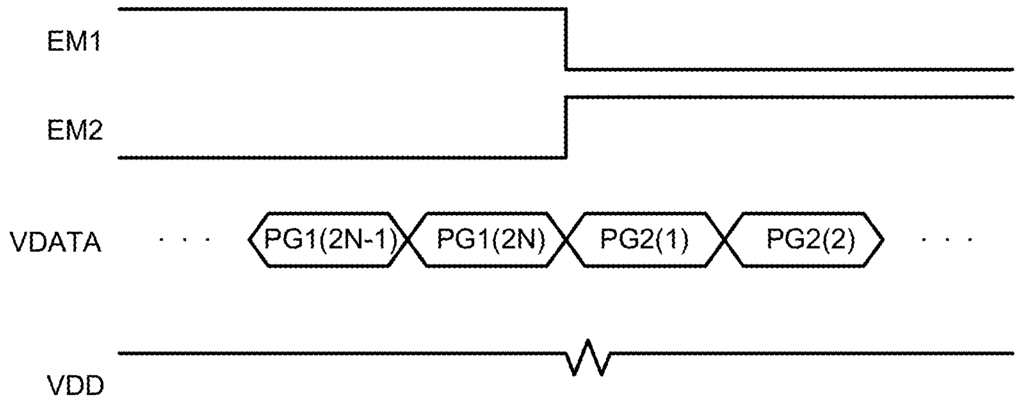
FIG. 10A is a timing diagram for a third frame of a light emitting display device according to still another embodiment of the present invention.
Figure 10B:
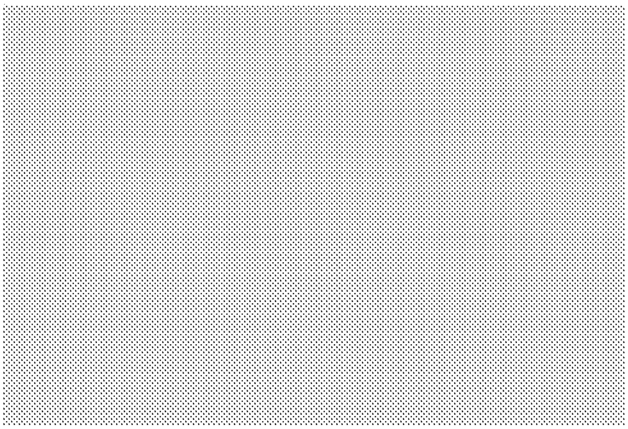
FIG. 10B is a diagram for the third frame when pixels in an even-numbered row of the light emitting display device according to still another embodiment of the present invention are driven.

FIG. 10A is a timing diagram for a third frame of a light emitting display device according to still another embodiment of the present invention. FIG. 10B is a diagram for the third frame when pixels in an even-numbered row of the light emitting display device according to still another embodiment of the present invention are driven. FIG. 10A is a timing diagram for emission signals EM1 and EM2, a data voltage VDATA and a high potential voltage VDD for last two rows of the first pixel group PG1 and first two rows of the second pixel group PG2 that is a pixel group PG immediately subsequent to the first pixel group PG1, in relation to a time at which the light emitting display device according to still another embodiment of the present invention expresses the third frame. FIG. 10B is a diagram illustrating a state in which a frame expressing a color of a specific grayscale is displayed, in which dark lines are shown in black and bright lines are shown in white. The light emitting display device according to still another embodiment of the present invention described with reference to FIGS. 10A to 10C differs from the light emitting display device 100 according to an embodiment of the present invention described with reference to FIGS. 1 to 8C only in that it is a case where the pixels PX in an even-numbered row are driven and the display panel 110 is configured to additionally display the third frame, but other components thereof are substantially the same, so a redundant description will be omitted.

The display panel 110 of the light emitting display device according to still another embodiment of the present invention may drive the pixels PX in an even-numbered row. In this case, the display panel 110 may be configured to alternately display the first frame, the second frame, and the third frame.

First, as described with reference to FIG. 7A, in the first frame, the rising time of the second emission signal EM2 may be identical to the start time of the data signal application time period for the last row PG1(2N) of the first pixel group PG1. Next, as described with reference to FIG. 8A, in the second frame, the falling time of the first emission signal EM1 may be identical to the start time of the data signal application time period for the second row PG2(2) of the second pixel group PG2.

Referring to FIG. 10A for a more detailed description of the third frame, the falling time of the first emission signal EM1 may be identical to the rising time of the second emission signal EM2 in the third frame. Specifically, in the third frame, the falling time of the first emission signal EM1 and the rising time of the second emission signal EM2 may be identical to the start time of the data signal application time period for the first row PG2(1) of the second pixel group PG2.

Referring to FIG. 10B, when the pixels PX in an even-numbered row of the light emitting display device are driven, both dark lines and bright lines may not be visible at boundaries between the pixel groups PG adjacent to each other in the third frame. Referring to FIG. 10A, in the third frame, the falling time of the first emission signal EM1 and the rising time of the second emission signal EM2 may be identical to the start time of the data signal application time period for the first row PG2(1) of the second pixel group PG2. Accordingly, both the falling time of the first emission signal EM1 and the rising time of the second emission signal EM2 may be identical to a start time of a data signal application time period for the pixels PX in an odd-numbered row. Accordingly, when the pixels PX in the even-numbered row are driven, a ripple of the high potential voltage VDD due to the falling of the first emission signal EM1 and the rising of the second emission signal EM2 may not occur. Accordingly, as shown in FIG. 10B, dark lines and bright lines may not be visible to a user in the third frame.

The display panel 110 of the light emitting display device according to still another embodiment of the present invention may be configured so that one frame where dark lines are visible, another frame where bright lines are visible, and still another frame where both dark lines and bright lines are not visible are alternately displayed. Accordingly, in the light emitting display device according to still another embodiment of the present invention, a luminance deviation capable of occurring when the display panel 110 is implemented such that the plurality of pixels PX are grouped to emit light in units of pixel groups PG can be improved. A ripple may occur in the high potential voltage line overlapping the emission signal line in a process in which the emission signal EM falls or rises and accordingly, dark lines or bright lines occur at the boundaries of the pixel groups PG adjacent to each other and thus, can be visible to a user. Accordingly, in the light emitting display device according to still another embodiment of the present invention, one frame where dark lines are visible and another frame where bright lines are visible are alternately displayed, and thus, the dark lines and the bright lines are offset from each other and at the same time, another frame where both dark lines and bright lines are not visible may be additionally alternated and displayed. Accordingly, dark lines and bright lines that actually occur may not be visible to a user and a luminance deviation capable of occurring at boundaries of the pixel groups PG when the plurality of pixels PX are driven in group units can be further improved.

The exemplary embodiments of the present disclosure can also be described as follows:

According to an aspect of the present disclosure, there is provided light emitting display device. The light emitting display includes a display panel including a first pixel group including a plurality of pixels in 2N rows, and a second pixel group disposed subsequent to the first pixel group and including a plurality of pixels in 2N rows. The light emitting display further includes an emission signal unit including a first emission stage for applying the same first emission signal to the first pixel group and a second emission stage for applying the same second emission signal to the second pixel group. In a first frame, a falling time of the first emission signal and a rising time of the second emission signal are different from each other. The falling time of the first emission signal is a time at which the first emission signal is inverted from a high voltage to a low voltage. The rising time of the second emission signal is a time at which the second emission signal is inverted from a low voltage to a high voltage.

In the first frame, the falling time of the first emission signal may be slower than the rising time of the second emission signal.

In the first frame, the falling time of the first emission signal may be slower than the rising time of the second emission signal by a data signal application time period for one row.

In a second frame, the falling time of the first emission signal may be slower than the rising time of the second emission signal. The falling time of the first emission signal in the first frame and the falling time of the first emission signal in the second frame may be different from each other. In the rising time of the second emission signal in the first frame and the rising time of the second emission signal in the second frame may be different from each other.

The first emission stage and the second emission stage may apply the first emission signal and the second emission signal to alternately drive the first frame and the second frame.

In the first frame, the falling time of the first emission signal may be identical to a start time of a data signal application time period for a first row of the second pixel group. In the first frame, the rising time of the second emission signal in the first frame may be identical to a start time of a data signal application time period for a last row of the first pixel group.

In the second frame, the falling time of the first emission signal may be identical to a start time of a data signal application time period for a second row of the second pixel group. In the second frame, the rising time of the second emission signal may be identical to a start time of a data signal application time period for the first row of the second pixel group.

The light emitting display may further include a plurality of emission signal lines connecting the emission signal unit and the plurality of pixels. The light emitting display may further include a plurality of high potential voltage lines applying a high potential voltage to the plurality of pixels. The plurality of emission signal lines and the plurality of high potential voltage lines may overlap and cross each other.

The light emitting display may further include a plurality of LEDs disposed in the plurality of pixels.

According to another aspect of the present disclosure, there is provided a light emitting display device. The light emitting display device includes a display panel including a plurality of pixel groups in which a plurality of pixels are grouped in units of a plurality of rows. The display panel is configured to drive pixels in an odd-numbered row or to drive pixels in an even-numbered row. The light emitting display device further includes a gate driver including a scan signal unit for applying a scan signal to the plurality of pixels and an emission signal unit for applying an emission signal to the plurality of pixels. The emission signal unit is configured to apply the same emission signal to pixels included in the same pixel group among the plurality of pixels. In a first frame and a second frame, a time at which a first emission signal that is applied to a first pixel group among the plurality of pixel groups is inverted from a gate-off voltage to a gate-on voltage, and a time at which a second emission signal that is applied to a second pixel group among the plurality of pixel groups is inverted from the gate-on voltage to the gate-off voltage differ from each other, so that the display panel is configured to alternately display the first frame in which dark lines are visible and the second frame in which bright lines are visible at a boundary between the plurality of pixel groups.

The display panel may be configured to drive the pixels in the odd-numbered row. In the first frame, the time at which the first emission signal is inverted from the gate-off voltage to the gate-on voltage may be identical to a start time of a data signal application time period for a first row of the second pixel group. In the first frame, the time at which the second emission signal is inverted from the gate-on voltage to the gate-off voltage may be identical to a start time of a data signal application time period for a last row of the first pixel group. In the second frame, the time at which the first emission signal is inverted from the gate-off voltage to the gate-on voltage may be identical to a start time of a data signal application time period for a second row of the second pixel group. In the second frame, the time at which the second emission signal is inverted from the gate-on voltage to the gate-off voltage may be identical to the start time of the data signal application time period for the first row of the second pixel group.

The display panel may be configured to alternately display the first frame, the second frame, and a third frame. In the third frame, the time at which the first emission signal is inverted from the gate-off voltage to the gate-on voltage may be identical to the start time of the data signal application time period for the second row of the second pixel group. In the third frame, the time at which the second emission signal is inverted from the gate-on voltage to the gate-off voltage may be identical to the start time of the data signal application time period for the last row of the first pixel group.

The display panel may be configured to drive the pixels in the even-numbered row. In the first frame, the time at which the first emission signal is inverted from the gate-off voltage to the gate-on voltage may be identical to a start time of a data signal application time period for a second row of the second pixel group. In the first frame, the time at which the second emission signal is inverted from the gate-on voltage to the gate-off voltage may be identical to a start time of a data signal application time period for a first row of the second pixel group. In the second frame, the time at which the first emission signal is inverted from the gate-off voltage to the gate-on voltage may be identical to the start time of the data signal application time period for the first row of the second pixel group. In the second frame, the time at which the second emission signal is inverted from the gate-on voltage to the gate-off voltage may be identical to a start time of a data signal application time period for a last row of the first pixel group.

The display panel may be configured to alternately display the first frame, the second frame, and a third frame. In the third frame, the time at which the first emission signal is inverted from the gate-off voltage to the gate-on voltage, and the time at which the second emission signal is inverted from the gate-on voltage to the gate-off voltage may be identical to the start time of the data signal application time period for the first row of the second pixel group.

The light emitting display device may further include a plurality of emission signal lines connecting the emission signal unit and the plurality of pixels. The light emitting display device may further include a high potential voltage line applying a high potential voltage to the plurality of pixels. When the emission signal which is transmitted through the plurality of emission signal lines falls or rises, a ripple may occur in the high potential voltage transmitted which is through the high potential voltage line.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

The invention claimed is:

1. An inorganic light emitting display device, comprising:

a display panel including:

a substrate including a display area and a non-display area, the display area being defined by a plurality of pixels;

a plurality of data lines and a plurality of scan lines arranged to cross each other on the substrate and respectively connected to the plurality of pixels;

a first pixel group including at least two pixels in 2N rows among the plurality of pixels; and a second pixel group disposed subsequent to the first pixel group and including at least two other pixels in 2N rows among the plurality of pixels; and an emission signal circuit including:

a first emission stage configured to apply a same first emission signal to the first pixel group; and a second emission stage configured to apply a same second emission signal to the second pixel group, wherein, in a first frame, a falling time of the first emission signal and a rising time of the second emission signal are different from each other, wherein the falling time of the first emission signal is a time at which the first emission signal is inverted from a high voltage to a low voltage, wherein the rising time of the second emission signal is a time at which the second emission signal is inverted from the low voltage to the high voltage, wherein, in a second frame, the falling time of the first emission signal is slower than the rising time of the second emission signal, wherein the falling time of the first emission signal in the first frame and the falling time of the first emission signal in the second frame are different from each other, and wherein the rising time of the second emission signal in the first frame and the rising time of the second emission signal in the second frame are different from each other.

2. The inorganic light emitting display device of claim 1, wherein, in the first frame, the falling time of the first emission signal is slower than the rising time of the second emission signal.

3. The inorganic light emitting display device of claim 2, wherein, in the first frame, the falling time of the first emission signal is slower than the rising time of the second emission signal by a data signal application time period for one row.

4. The inorganic light emitting display device of claim 1, wherein the first emission stage and the second emission stage are configured to apply the first emission signal and the second emission signal, respectively, to alternately drive the first frame and the second frame.

5. The inorganic light emitting display device of claim 1, wherein:

in the first frame, the falling time of the first emission signal is identical to a start time of a data signal application time period for a first row of the second pixel group, and in the first frame, the rising time of the second emission signal is identical to a start time of a data signal application time period for a last row of the first pixel group.

6. The inorganic light emitting display device of claim 5, wherein:

in the second frame, the falling time of the first emission signal is identical to a start time of a data signal application time period for a second row of the second pixel group, and in the second frame, the rising time of the second emission signal is identical to a start time of a data signal application time period for the first row of the second pixel group.

7. The inorganic light emitting display device of claim 1, further comprising:

a plurality of emission signal lines connecting the emission signal circuit and the plurality of pixels; and a plurality of high potential voltage lines configured to apply a high potential voltage to the plurality of pixels, wherein the plurality of emission signal lines and the plurality of high potential voltage lines overlap and cross each other.

8. The inorganic light emitting display device of claim 7, wherein when the emission signal transmitted through the plurality of emission signal lines falls or rises, a ripple occurs in the high potential voltage transmitted through the high potential voltage line.

9. The inorganic light emitting display device of claim 1, further comprising:

a gate driver including a scan signal circuit configured to apply a scan signal to the plurality of pixels.

10. The inorganic light emitting display device of claim 9, wherein each of the plurality of pixels includes:

a first transistor including a gate electrode connected to an input terminal of a first scan signal, a source electrode connected to the data line supplying the data voltage, and a drain electrode connected to a first node;

a second transistor including a source electrode connected to a third node, a drain electrode connected to a second node, and a gate electrode connected to the input terminal of the first scan signal;

a third transistor including a gate electrode connected to an input terminal of an emission signal, a source electrode connected to the first node, and a drain electrode connected to an input terminal of a reference voltage;

a fourth transistor including a source electrode connected to the third node, a drain electrode connected to a fourth node, and a gate electrode connected to the input terminal of the emission signal;

a fifth transistor including a drain electrode connected to the fourth node, a source electrode connected to the input terminal of the reference voltage, and a gate electrode connected to an input terminal of a second scan signal;

a driving transistor including a source electrode connected to an input terminal of a high potential voltage, a gate electrode connected to the second node, and a drain electrode connected to the third node, the driving transistor being configured to control a driving current according to a voltage between the source electrode and the gate electrode of the driving transistor;

a storage capacitor including a first electrode connected to the first node and a second electrode connected to the second node; and a light emitting element (LED) including an anode connected to the fourth node and a cathode connected to an input terminal of a low potential voltage, the LED being configured to emit light based on the driving current supplied from the driving transistor.

11. The inorganic light emitting display device of claim 10, wherein the high voltage of the first and second emission signals is a gate-off signal, and the low voltage of the first and second emission signals is a gate-on signal.

12. The inorganic light emitting display device of claim 10, wherein:

the first transistor is configured to apply the data voltage supplied from the data line to the first node in response to the first scan signal, the second transistor is configured to diode-connect the gate electrode and the drain electrode of the driving transistor in response to the first scan signal, the third transistor is configured to apply the reference voltage to the first node in response to the emission signal, the fourth transistor is configured to form a current path between the third node and the fourth node in response to the emission signal, and the fifth transistor is configured to apply the reference voltage to the fourth node in response to the second scan signal.

13. The inorganic light emitting display device of claim 1, wherein the display panel is configured to alternately display the first frame in which dark lines are visible and the second frame in which bright lines are visible at a boundary between the first pixel group and the second pixel group.

14. The inorganic light emitting display device of claim 1, wherein:

the display panel includes a plurality of pixel groups and is configured to drive the pixels in odd-numbered rows, in the first frame, the falling time of the first emission signal is identical to a start time of a data signal application time period for a first row of the second pixel group, in the first frame, the rising time of the second emission signal is identical to a start time of a data signal application time period for a last row of the first pixel group, in the second frame, the falling time of the first emission signal is identical to a start time of a data signal application time period for a second row of the second pixel group, and in the second frame, the rising time of the second emission signal is identical to the start time of the data signal application time period for the first row of the second pixel group.

15. The inorganic light emitting display device of claim 14, wherein:

the display panel is configured to alternately display the first frame, the second frame, and a third frame, in the third frame, a falling time at which the first emission signal is inverted from the high voltage to the low voltage is identical to the start time of the data signal application time period for the second row of the second pixel group, and in the third frame, a rising time at which the second emission signal is inverted from the low voltage to the high voltage is identical to the start time of the data signal application time period for the last row of the first pixel group.

16. The inorganic light emitting display device of claim 14, wherein:

the display panel includes a plurality of pixel groups and is configured to drive the pixels in even-numbered rows, in the first frame, the falling time of the first emission signal is identical to a start time of a data signal application time period for a second row of the second pixel group, in the first frame, the rising time of the second emission signal is identical to a start time of a data signal application time period for a first row of the second pixel group, in the second frame, the falling time of the first emission signal is identical to the start time of the data signal application time period for the first row of the second pixel group, and in the second frame, the rising time of the second emission signal is identical to a start time of a data signal application time period for a last row of the first pixel group.

17. The inorganic light emitting display device of claim 16, wherein:

the display panel is configured to alternately display the first frame, the second frame, and a third frame, in the third frame, a falling time at which the first emission signal is inverted from the high voltage to the low voltage is identical to the start time of the data signal application time period for the first row of the second pixel group, and in the third frame, a rising time at which the second emission signal is inverted from the low voltage to the high voltage is identical to the start time of the data signal application time period for the first row of the second pixel group.

* * * * *